June 20, 1961   O. H. BANKER   2,989,072
RELIEF VALVE FOR HIGH PRESSURES
Filed April 24, 1959   2 Sheets-Sheet 1

INVENTOR:
OSCAR H. BANKER
BY
Charles J. Vojtech
ATT'Y

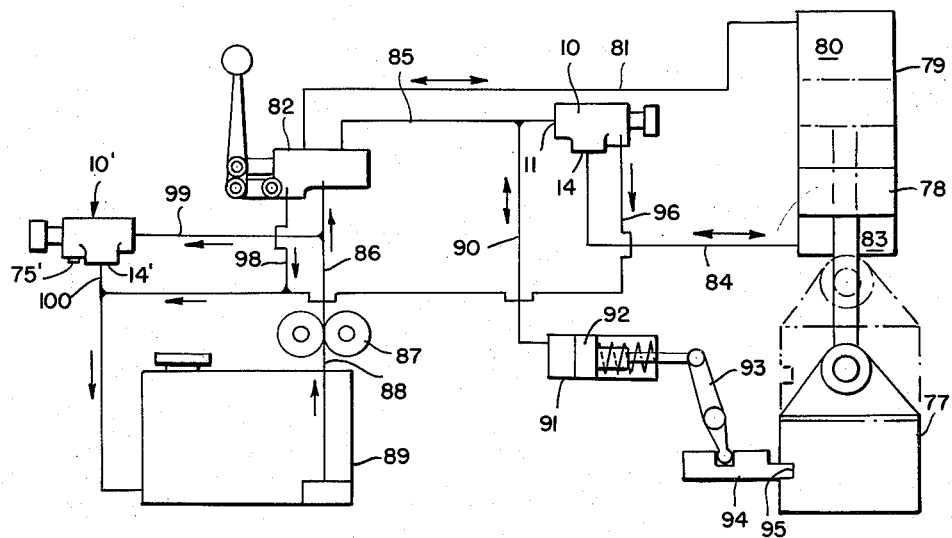

United States Patent Office 2,989,072
Patented June 20, 1961

2,989,072
RELIEF VALVE FOR HIGH PRESSURES
Oscar H. Banker, Evanston, Ill., assignor, by mesne assignments, to Fawick Corporation, Cleveland, Ohio, a corporation of Michigan
Filed Apr. 24, 1959, Ser. No. 808,655
2 Claims. (Cl. 137—491)

This invention relates to fluid pressure relief valves and particularly to such valves which are designed to limit pressures in a system to relatively high values, of the order of 1000 p.s.i. or more The valve may, of course, be used with lower pressures down to 100 p.s.i., but when so used, full advantage is not taken of its maximum capabilities.

In the ordinary sense, a relief valve is a device having a vent opening or port which is closed by a ball or a plunger element held in closed position by a spring. The spring pressure thus acts in opposition to the fluid pressure on the ball or plunger and must develop a force equal to that exerted by the fluid on the latter at a point just below that at which the valve is to open to relieve the pressure in the system.

It may be apparent that a relief valve of the type hereinabove described requires a very large spring, in fact, so large as to make the device impractical. In order to reduce the size of a relief valve designed for high pressure systems, designers have resorted to the use of a small pilot valve exposed to the pressure in the system in association with the relief valve. In the pilot valve a very small vent port was closed by a spring-pressed ball or plunger. The main relief valve or plunger was held closed by fluid pressure acting upon an unbalanced portion thereof, with means, dictated to by the pilot valve for venting the unbalanced portion of the valve to permit the pressure in the system to open the main valve and thus relieve pressure therein. The main valve or plunger had axially spaced portions of different diameters, the smaller diameter portion facing the pressure in the system and being utilized to close the vent opening. Pressure from the system was brought to bear against the larger diameter by fluid entering therebehind through a small orifice in the plunger communicating with the fluid under pressure in the system, and the pressure thus developed behind the portion of larger diameter assisted in holding the main valve or plunger in its closed position.

The function of the pilot valve in the aforementioned prior art designs was to relieve the pressure behind the portion of larger diameter so that an unbalanced condition was created in the main valve or plunger in an opening direction. It was found, however, that since the orifice remained open at all times, flow of fluid under pressure continued through the orifice behind the portion of larger diameter and established a pressure which, though lower than the cutoff pressure for the system, nevertheless was considerably higher than the vent pressure, and hence a balanced condition was reached which held the main valve suspended in its open position. In other words, although the pressure in the system was higher than the pressure created by the flow through the orifice behind the portion of greater diameter, the greater pressure on one side acting upon a smaller diameter equalled the unit pressure on the opposite side acting upon a larger diameter, thereby creating a balanced condition and causing the valve to remain open. This balanced condition could be eliminated by increasing the size of the orifice so that pressure of fluid on the portion of greater diameter could be built up more quickly, but the selection of the proper sized orifice to produce the desired result was a difficult and delicate undertaking.

It is an object of this invention to provide a high pressure relief valve utilizing the pilot valve principle for its operation, wherein the tendency for the pressures on both sides of the main relief valve to equalize is greatly reduced, or is eliminated entirely.

Another object of this invention is the provision of a pilot operated relief valve for high pressures utilizing a small orifice wherein the creation of the small orifice by the use of a drill of the size of the orifice is eliminated, and the orifice is formed instead by less delicate and more accurate machining operations.

Yet another object of this invention is the elimination of ground and lapped valve parts operating in honed chambers, without adversely affecting the precision of the valve as a whole.

This invention also has within its purview the provision of a design for an orifice for a pilot-type relief valve, wherein the clogging of the orifice is substantially eliminated, thereby improving the reliability of the valve.

Among the more general objects of this invention are the provision of a pilot type relief valve for high pressures which is compact and inexpensive, which is sufficiently rugged to withstand the high pressures to which it is to be subjected, and which is so constructed as to function as a sequence valve if desired.

These and other objects and features of this invention will become apparent from the following detailed description when taken together with the accompanying drawings in which, FIG. 1 is an enlarged side elevational view in section of a pilot operated relief valve made in accordance with this invention;

FIG. 4 is a schematic diagram of a hydraulic system using the valve of this invention as a sequence valve; and FIG. 5 is a side elevational view in section of a modification of the valve of FIG. 1.

Figure 1:
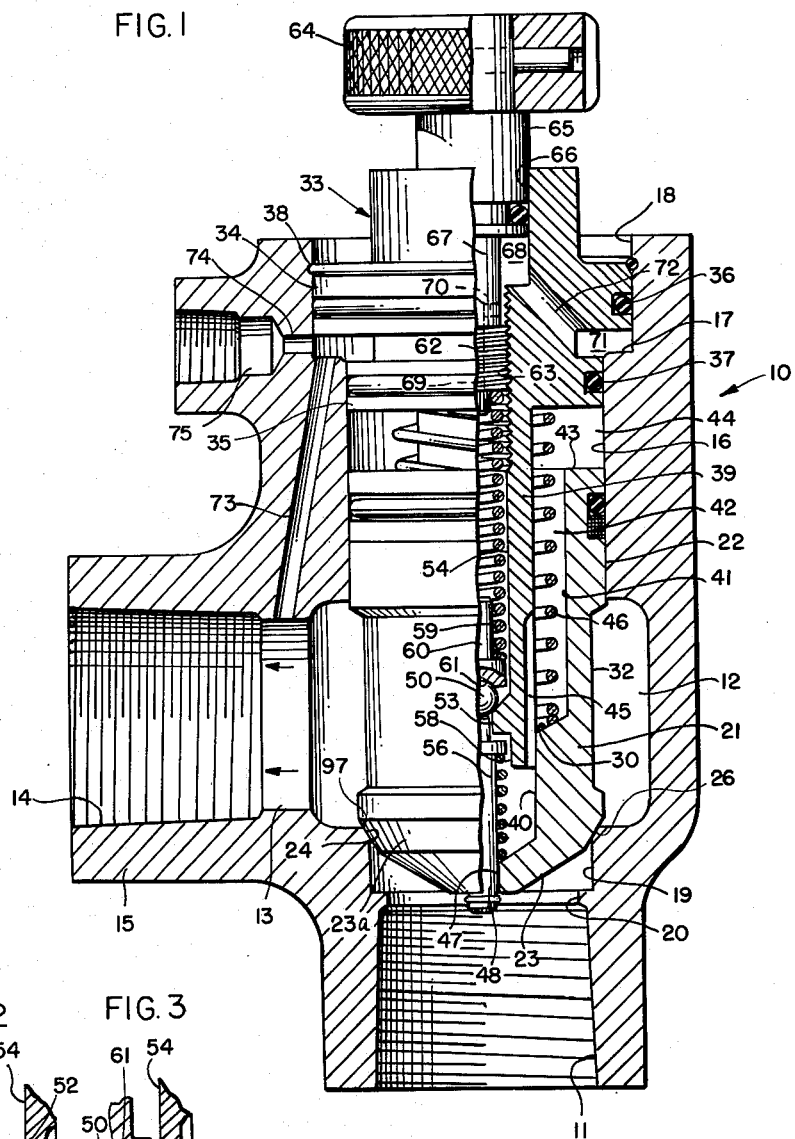

Referring now to the drawings for a detailed description of the invention, and particularly to FIG. 1, wherein a preferred embodiment of the invention is illustrated, there is shown the body 10 of the valve, which body may be a casting of sufficient strength to withstand the high pressures to which it will be subjected in use. Said body 10 is somewhat in the form of an L-fitting and has a threaded inlet opening 11 in one end, and a cored chamber 12 spaced inwardly from the inlet opening 11 and communicating through a short side opening 13 with a threaded outlet opening 14 formed in a boss 15 extending laterally from the body 10. A bore 16 extends upwardly from chamber 12, as viewed in FIG. 1, and is connected by a shoulder 17 to a counterbore 18 opening upon the exterior of body 10. Chamber 12 is connected to inlet opening 11 through a bore 19 which may be of larger diameter than the inner end 20 of inlet opening 11.

Access to chamber 12 and outlet opening 14 from inlet opening 11 is normally blocked by a relief valve plunger 21 which is formed with a relatively long cylindrical portion 22 having a sliding fit in bore 16 and serving to guide the plunger in its reciprocating movements in body 10. The lower end of plunger 21 as viewed in FIG. 1 has a frusto-conical contour 23 of one cone angle joined to a frusto-conical valve surface 26 of a different contour, both extending into bore 19. Said bore 19 is of smaller diameter than bore 16 for a purpose hereinafter to be described. A frusto-conical surface 24 on the lower side of chamber 12, as viewed in FIG. 1, provides a bearing surface for frusto-conical surface 26. It is contemplated that surfaces 24 and 26 will match sufficiently closely in contour to effect a fluid-tight seal therebetween.

Plunger 21 is formed with a peripheral groove 32 facing upon chamber 12 to promote rapid flow of fluid therearound and into the outlet opening 14.

Bores 16 and 18 are closed by a plug 33 having a cylindrical flange 34 disposed with an ordinary machined fit in bore 18 and a smaller flange 35 fitting with the same tolerances in bore 16. The flanges 34 and 35 are hydraulically sealed to their respective bores by O-ring seals 36 and 37, respectively. The plug 33 is restrained against movement out of bore 18 by a snap ring 38. Below flange 35, as viewed in FIG. 1, plug 33 is of reduced diameter and comprises a cylindrical extension 39 which has a sliding fit with respect to a recess 40 in the lower end of plunger 21.

Recess 40 in plunger 21 is enlarged at 41 to form an annular chamber 42 around extension 39. Flange 35 on plug 32 is axially spaced from the end 43 of plunger 21 to form an enlarged annular chamber 44 between the said end 43 and flange 35. Communication is established between recess 40 and the enlarged recess 41 by one or more axially disposed grooves 45 formed in the lower end (FIG. 1) of extension 39. Thus any fluid entering recess 40 may pass through the axial grooves 45 into recess 41 and then into chamber 42 and chamber 44 behind plunger 21.

It is contemplated that plunger 21 will normally be seated upon the frusto-conical surface 24 of the valve body 10 and to this end a spring 46 is inserted around extension 39 between flange 35 and the bottom 30 of recess 41, said spring being normally in compression to exert a force upon plunger 21 in the direction of said surface 24 and also to urge plug 33 in the opposite direction against snap ring 38.

It is contemplated that in addition to the pressure supplied by spring 46, plunger 21 will be held against its seat by fluid pressure supplied by fluid which has entered recesses 40 and 41 and chamber 44 from inlet opening 11. It is provided further that the opening in plunger 21 through which the fluid passes from inlet opening 11 into recess 40 shall have a small effective area, such that it will function as an orifice. To this end the plunger 21 has a drilled and reamed opening 47 concentrically disposed with respect to the lower portion of the frusto-conical contour on said plunger, said opening being of a relatively large size which may be several times the area of the orifice desired. The area of the opening is then reduced by the insertion thereinto of the energizing pin 48 of a pilot valve hereinafter to be described. Said pin is cylindrical in contour and forms an annular orifice 49 (FIG. 2) through which fluid may pass from inlet opening 11 into recesses 40 and 41 and thence into chamber 44 behind plunger 21 to add fluid pressure to the pressure of spring 41 to hold plunger 21 against surface 24 in valve body 10 to close chamber 12 to inlet opening 11.

The pilot valve referred to above is comprised of a ball 50 which bears against a corner 51 (FIG. 2) formed by the intersection of a conical surface 52 and a cylindrical surface 53 on the interior of extension 39 on plug 33. The cylindrical surface 53 forms a round opening into a chamber 54 extending upwardly to the exterior of said plug 33. The cylindrical opening 53 is partially closed by the upper end 55 of the energizing pin 48 which is held in contact with ball 50 by a spring 56 surrounding pin 48 and bearing at its bottom end, as viewed in FIGS. 1 and 2, against the bottom of recess 40 in plunger 21, and at its upper end, against a flange 57 formed on pin 48. The lower end of the extension 39, as viewed in FIGS. 1 and 2, has a counterbore 58 to receive flange 57 loosely, such that fluid may pass around the flange and into the opening formed by cylindrical surface 53 around the upper end 55 of the energizing pin 48 and against ball 50.

The pilot valve is normally held closed by a spring 59 in chamber 54 acting at its lower end, as viewed in FIG. 1, against a shouldered pin 60 which, in turn, has a conical recess 61 within which ball 50 is received and by which the pressure of spring 59 is transmitted from the shouldered pin 60 to the ball 50. Pressure is exerted upon the upper end of spring 59 (FIG. 1) by a screw 62 turning in the threaded portions 63 of the wall of chamber 54. Screw 62 may be manipulated from the exterior by a knurled knob 64 formed on an enlarged cylindrical portion 65 of the screw 62 and received in counterbore 66 formed in the end of chamber 54. Enlarged cylindrical portion 65 is separated from the threaded portion of screw 62 by a neck 67 to form an annular chamber 68 between the enlarged cylindrical portion 65 and the bottom of the counterbore 66. Said chamber 68 communicates with chamber 54 through an axial bore 69 and one or more crossbores 70 in the lower end (FIG. 1) of the screw 62.

Chamber 68 also communicates with the chamber formed between shoulder 17 on valve body 10 and flange 34 on plug 33 through a passage 72, and chamber 71 is then connected directly to the short side opening 13 in valve body 10 by a passage 73. Thus chamber 54 is substantially at the same pressure as the side opening 13, and if the outlet opening 14 is connected to vent or to the atmosphere, then chamber 54 will always be at vent or atmospheric pressure. It is contemplated, however, that under certain circumstances it may be desirable to use the valve in a hydraulic system as a sequence valve, and when so used, passage 73 is plugged and chamber 71 is connected instead to an outlet passage 74 which is enlarged and threaded at 75 to receive an appropriate fitting. The manner in which the valve 10 is used as a sequence valve will be described hereinafter. When not used as a sequence valve, passage 74 is plugged.

When valve 10 is installed as a relief valve (i.e., with passage 74 plugged) inlet opening 11 is connected to the system, the pressure of which is to be limited, and outlet opening 14 is connected to the sump or reservoir. Fluid under pressure at inlet opening 11 acts against the end of plunger 21 extending into bore 19 and urges said plunger upwardly against spring 46. At the same time, fluid under pressure passes through the annular orifice between opening 47 and pin 48 into recess 40, axial grooves 45, enlarged recess 41 into chamber 44 behind plunger 21 to urge the plunger in the opposite direction. Since the area of plunger 21 in bore 16 is larger than the area of plunger 21 in bore 19, the plunger is hydraulically unbalanced in favor of holding the plunger on shoulder 24 to close the inlet opening to the vent chamber 12. To the hydraulic unbalance is added the pressure of spring 46.

Figures 2, 3:
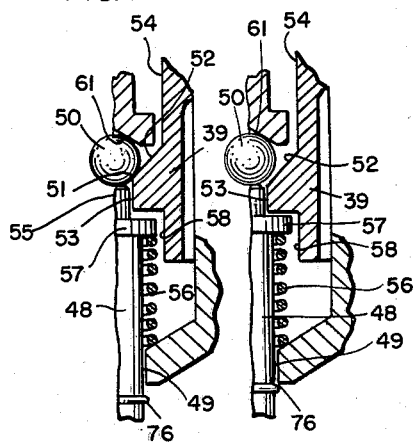
FIG. 2 is an enlarged fragmentary elevational view in section of the pilot valve and orifice in one phase of its operation.
FIG. 3 is a view similar to FIG. 2 showing the pilot valve in its operated or open condition.

Fluid under pressure at inlet opening 11 also acts upon the end of pilot valve pin 48 in said opening to push the pin against ball valve 50 and spring 59. The effective area of pin 48 is that of the end which extends into the inlet opening. When the fluid pressure on pin 48 exceeds that of spring 59, ball 50 will be pushed off its seat as shown in FIG. 3 and the fluid pressure in recess 40 and connected passages and bores will be vented, thereby creating a hydraulic unbalance in favor of lifting the plunger 21 off shoulder 24 and allowing fluid to pass into outlet opening 14 to relieve the pressure in the system.

When the pressure in inlet opening 11 falls to the point where the pressure exerted by the fluid therein on pin 48 and the pressure of spring 56 is less than the pressure of spring 59 acting in the opposite direction, ball 50 will again be seated on corner 51 and the pressure of the fluid in recess 40 and connecting recesses, passages and bores will build up through fluid entering the annular orifice around pin 48 until the pressure of the fluid behind plunger 21 and the force of spring 46 exceed the pressure of the fluid on the plunger in bore 19, whereupon the plunger will seat upon shoulder 24 and close the inlet opening to chamber 12.

In some instances it may be desirable to add a snap ring 76 to pin 48 to limit its movement into extension 39 during assembly of the valve. The rate of spring 59 is such that its pressure will increase above that of the fluid on pin 48 as soon as ball 50 is unseated, and will hold the ball and pin 48 at a position wherein flange 57 is out of contact with the bottom of counterbore 58.

The pressure at which valve 10 will open can be regulated merely by turning knurled knob 64. This can be done at any time, whether or not there is pressure in the system.

When the valve 10 is used as a sequence valve, it may be connected into the system as shown in FIG. 4. For this purpose, passage 73 is plugged, and outlet opening 74 is unplugged. In the typical installation shown in FIG. 4, the device to be controlled is shown schematically for illustrative purposes as a hydraulically operated press or ram 77 which is connected to the piston 78 of a double-acting cylinder 79. One side 80 is connected by a pipe 81 to a control valve 82 of known construction. The other side 83 is connected by a pipe 84 to the outlet opening 14 of valve 10, the inlet opening 11 being connected by a pipe 85 to control valve 82. Said valve 82 has an inlet side connected by a pipe 86 to the discharge side of a pump 87, the intake side of which is connected by a pipe 88 to a reservoir or sump 89.

Pipe 85 has a branch 90 connected to a single acting cylinder 91 in which is a piston 92 and rod connected through a lever 93 to a latch 94 slidable into a recess 95 in the side of ram 77. Latch 94 prevents an upward movement of ram 77 until adequate pressure is available to effectuate such movement. The threaded end 75 of outlet opening 74 is connected by a pipe 96 to reservoir 89.

With the devices as arranged in FIG. 4, operation of control valve 82 to vent side 80 and apply fluid under pressure to side 83 admits fluid under pressure to the inlet opening of valve 10 through pipe 85. Assuming that cylinder 91 is operative at 350 p.s.i. and cylinder 79 at 1000 p.s.i., and that valve 10 is set to release at 500 p.s.i., said valve 10 will close outlet opening 14 while the pressure of the system is building up to 500 p.s.i. Meanwhile, when the pressure reaches 350 p.s.i., cylinder 91 will operate to withdraw latch 94, thereby freeing ram 77 for operation by cylinder 79. When the pressure in pipe 85 reaches 500 p.s.i., valve 10 will open and allow fluid to flow into side 83 of cylinder 79 and build up a pressure of 1000 p.s.i.

When it is desired to lower ram 77 it is necessary to vent side 83. Referring again to FIG. 1, it will be observed that the diameter of plunger 21 in bore 16 is larger than the diameter of corner 97 of shoulder 24 so that when chamber 12 is under hydraulic pressure, plunger 21 will be unbalanced to open chamber 12 to bore 19 and inlet opening 11. Spring 46, however, will act in the opposite direction. Hence when it is necessary to vent side 83 of cylinder 79, the fluid under pressure in that side and in the connecting pipe 84 and chamber 12 of valve 10 will hold plunger 21 in its raised position and allow the fluid to flow out of inlet opening 11 into pipe 85 and through the vent pipe 98 thereof into return pipe 96.

Thus valve 10 prevents an application of fluid under pressure to side 83 of cylinder 79 while latch 94 is being released so that it is not required to release the latch under load. Venting of the cylinder through valve 10 is accomplished because of the unbalanced construction of the valve plunger in the outlet chamber.

The system of FIG. 4 may be safeguarded against excessive pressures by a second valve 10' connected through a pipe 99 to pipe 86 on the discharge side of pump 87, a pipe 100 serving to connect the valve to the vent pipe 98. Valve 10' is connected as a relief valve and hence its outlet opening 75' corresponding to outlet opening 75 in FIG. 1 is plugged and its passage 74 (not shown) is connected to the vent or outlet opening 14'.

In a typical installation of valve 10 having a capacity of 30 gallons per minute it has been found that the valve will maintain a constant pressure from ¼ gallon per minute flow up to its maximum of 30 gallons per minute, without noise or chatter. Maximum pressure differential from a trickle to full flow is less than 100 p.s.i. There is less than 50 p.s.i. differential between cracking open of the valve and closing. Valve 10 can thus be used as a pressure regulator since it can maintain a required pressure, within 100 p.s.i., at every rate of flow up to its full capacity.

In the modification shown in FIG. 5, the spring 56 of FIG. 1, which holds the pin 48 against ball 50, has been eliminated. In addition, the pin 48 is held captive in bore 58 by a rolled over edge 101 on the forward end 102 of the extension 39 which is tapered to facilitate such rolling over of said edge. Since rolled over edge 101 serves to hold pin in assembled relation with extension 39, the snap ring 76 (FIG. 1) is not necessary in the FIG. 5 form.

It is understood that the foregoing description is merely illustrative of a preferred embodiment of the invention and that the scope of the invention is not to be limited thereto but is to be determined by the appended claims.

I claim:

1. A relief valve comprising a valve body having a chamber therein, inlet and outlet openings for the chamber in communication with one another, a first valve in the chamber adapted to close the inlet opening to the outlet opening, an abutment on the valve body, resilient means acting upon the first valve and abutment in a direction to close the inlet opening, said first valve having an opening therethrough communicating with the inlet opening and with the chamber behind the first valve to establish fluid pressure behind the said first valve acting in the direction of the resilient means, said valve body having a second outlet opening, a second valve establishing communication between the chamber behind the first valve and the second outlet opening to vent the chamber behind the first valve, said second valve having an effective area exposed to the fluid in the chamber behind the first valve, resilient means acting upon the second valve in opposition to the fluid in the chamber behind the first valve, said second valve being opened by the fluid in the chamber upon the attainment in said fluid in contact with the effective area of the second valve of a pressure exceeding the pressure of the resilient means acting in opposition thereto, plunger means extending through the opening in the first valve and exposed to the fluid in the said inlet opening, an abutment on said plunger means, and resilient means acting on said last mentioned abutment and on the first valve to hold said plunger against said second valve, said plunger being adapted to contact the second valve and hold said second valve open until the pressure of the resilient means acting upon the second valve exceeds the combined pressure of the resilient means acting on the plunger and the pressure of the fluid in the inlet opening acting upon the plunger.

2. A relief valve as described in claim 1, said opening in the first valve communicating with the inlet opening and with the chamber behind the first valve being circular in radial cross-section, and said plunger means extending through the opening in the first valve being of cylindrical form over the region thereof which passes through said opening in the first valve and having a clearance with respect to said opening the radial cross-section area of which is small compared to the cross-sectional area of the pin, whereby said clearance functions as an orifice.

References Cited in the file of this patent

UNITED STATES PATENTS

| | | |
|---|---|---|
| 781,913 | Schutte | Feb. 7, 1905 |
| 1,518,942 | Spear | Dec. 9, 1924 |
| 1,798,631 | Rodler | Mar. 31, 1931 |
| 1,916,767 | Mason | July 4, 1933 |
| 2,827,075 | Mercier | Mar. 18, 1958 |